G. W. HUBBARD.
TROTTING SULKY.
APPLICATION FILED APR. 4, 1910.
970,828.
Patented Sept. 20, 1910.
2 SHEETS—SHEET 1.
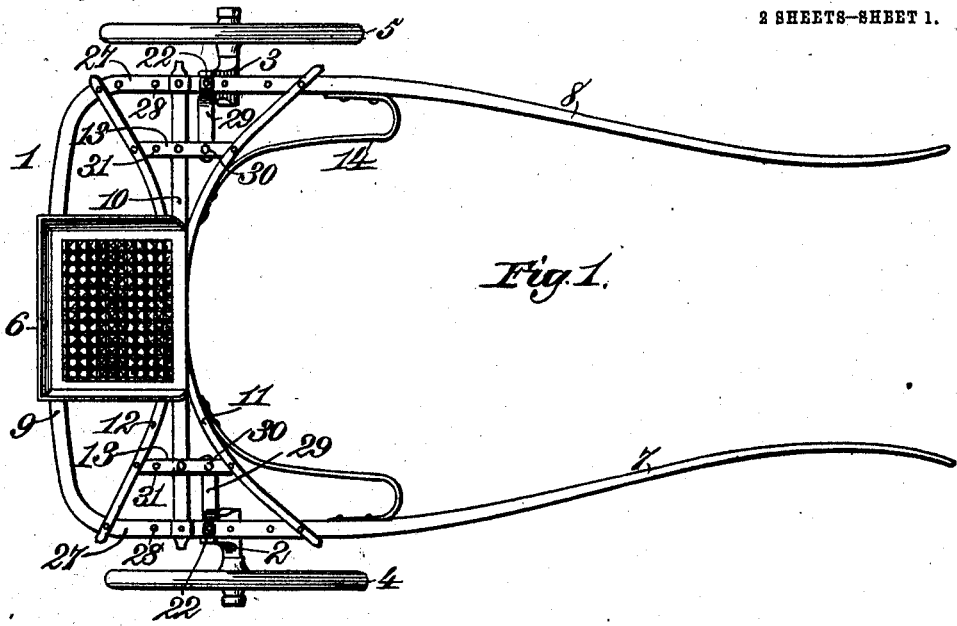
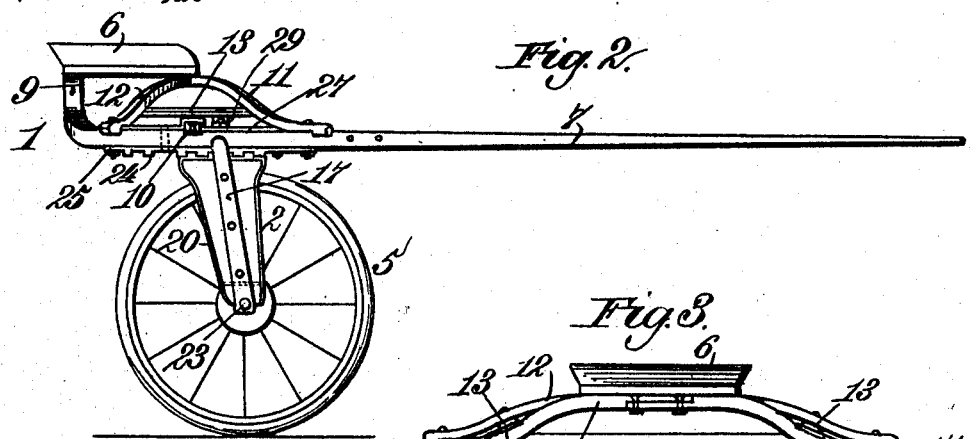
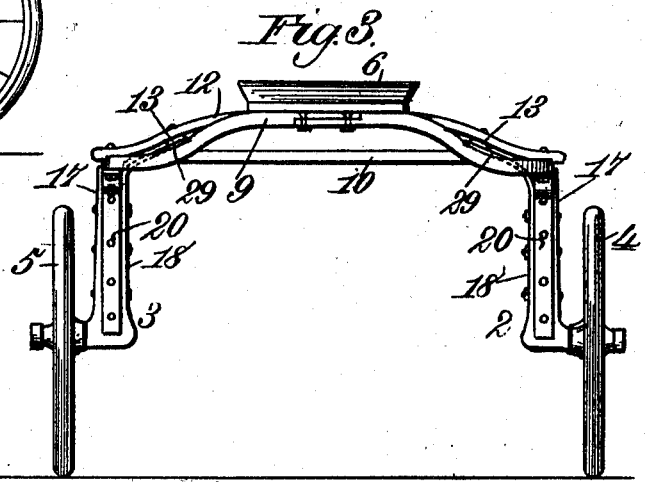
Witnesses:
Inventor:
George W. Hubbard.

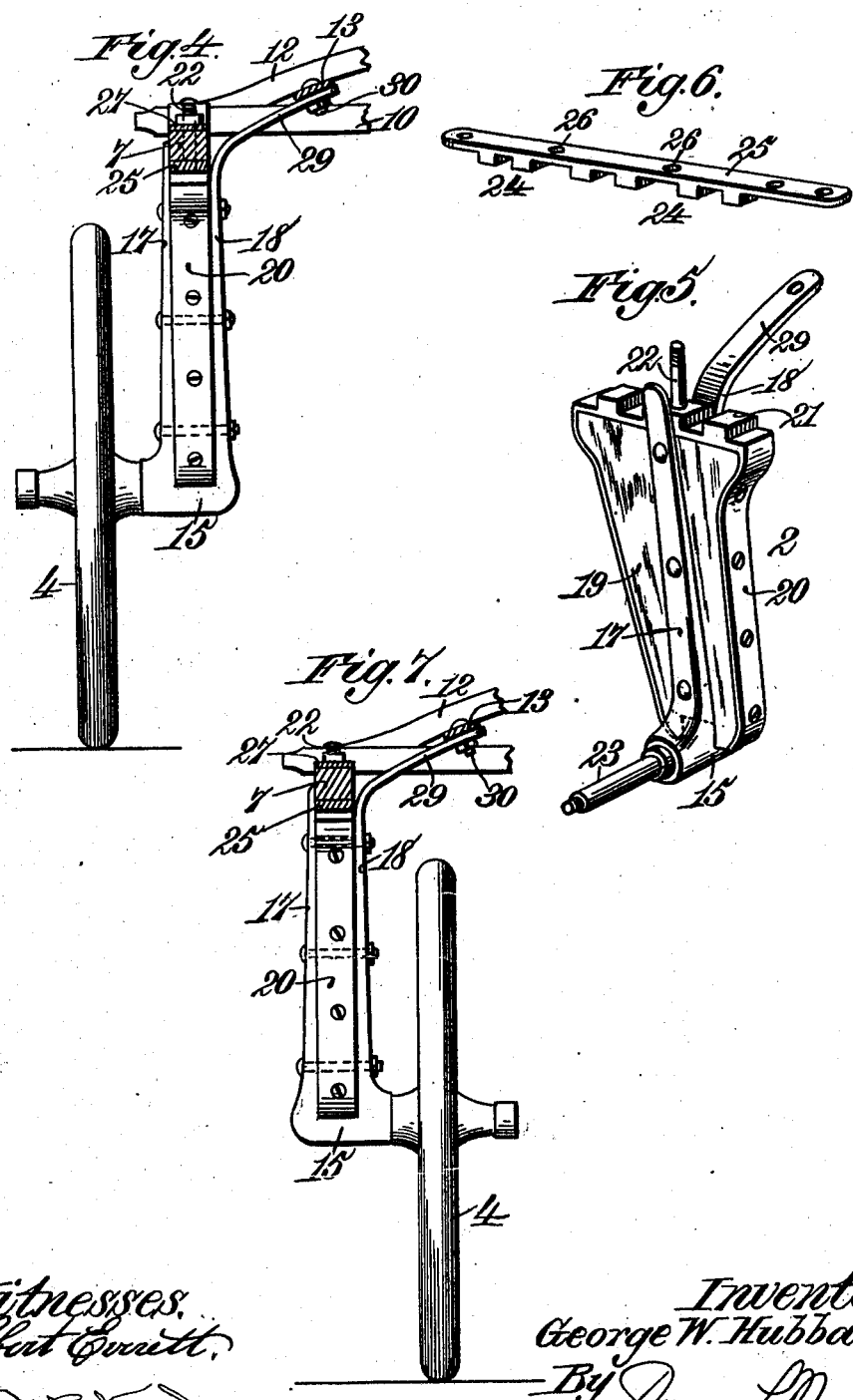

UNITED STATES PATENT OFFICE.

GEORGE W. HUBBARD, OF COCKEYSVILLE, MARYLAND.

TROTTING-SULKY.

970,828.  Specification of Letters Patent.  Patented Sept. 20, 1910.

Application filed April 4, 1910.  Serial No. 553,199.

*To all whom it may concern:*

Be it known that I, GEORGE W. HUBBARD, a citizen of the United States, residing at Cockeysville, in the county of Baltimore and State of Maryland, have invented new and useful Improvements in Trotting-Sulkies, of which the following is a specification.

The present invention is an improvement in trotting sulkies.

It comprehends, generally, the production of a vehicle of the class specified, the various parts of which are so constructed and arranged as to constitute a rigid framework, when connected together, and to provide for a relative adjustment between the shafts and wheels, the invention residing more especially in the particular form of axle arms employed, in the coöperating devices associated with the latter and with the shafts, and in the mounting or support for the seat.

A structural embodiment of the invention is illustrated in the accompanying drawings wherein—

Figure 1 is a plan view of the improved sulky; Figs. 2 and 3 are respectively a side elevation and a rear elevation of Fig. 1; Fig. 4 is an enlarged detail view, with parts in section, showing the manner in which the axle arms are connected with the sulky frame; Figs. 5 and 6 are perspective views respectively of one axle arm and its associated shaft-carried strap; and Fig. 7 is a modification of the structure shown in Fig. 4.

The essential parts of the sulky, as shown in said drawings, comprise a frame or body, indicated in a general manner by the numeral 1, and a pair of axle arms 2 and 3, the wheels 4 and 5 being carried by said arms, and the seat 6 mounted on said frame, as hereinafter fully described.

The shafts 7 and 8, which constitute the main members of the frame, have their rear ends curved inwardly and upwardly toward each other and fastened together at their overlapping mortised terminals, as shown in Fig. 3, the upwardly-bent portions uniting in forming a bow 9 which constitutes one of the supports for the seat. Adjacent the points where the inward curvature of the shafts commences, the latter are connected by the usual tree 10, and, in addition to that element, by front and rear tie bars 11 and 12. In the present construction, these bars are arched, and project upwardly and into contact with each other, the height of the arches at their point of contact being the same as that of the bow 9. Their terminals are preferably received in seats formed in the upper surfaces of the shafts, wherein they are bolted or otherwise securely fastened. They are also rigidly connected together by a pair of straps 13 which are arranged parallel with and adjacent to the corresponding shafts and are fastened centrally to tree 10. The seat 6 rests upon the bow 9 afore-mentioned, and upon the arch bars 11 and 12 at the point where the latter meet each other, as shown in Fig. 2, and thus constitutes a tie therebetween, suitable fastening devices of any desired type being employed. By reason of this construction, it will be apparent that a rigid frame or body is produced, since the two shafts are securely tied together by the arch bars and the tree, which are in turn connected by the straps 13. Moreover, the connection between the seat with the bow 9 and the meeting points of the arch bars further serves to strengthen the frame and also renders the employment of the usual seat-supporting brackets unnecessary. The frame may be strengthened to a still further extent by means of the foot-rests 14 which, in the construction illustrated, are constituted by bent rods rigidly fastened at their front ends to the shafts and at their rear ends to the front arch bar 11 adjacent the central portion thereof. The resultant frame, as a whole, is thus exceedingly compact and strong, and since all unnecessary parts are eliminated, its weight is reduced to a considerable extent, and, in fact, may be further reduced by constructing the parts of the frame of light material wherever possible.

As originally stated, the two axle arms 2 and 3 are so constructed as to provide for a relative adjustment between them and the frame shafts. This is preferably effected by providing said arms with toothed portions or members which are arranged for adjustable engagement with similarly toothed members attached to the shafts. One of these arms is illustrated in Fig. 5, wherein it is shown as comprising a clip member 15 of substantially U-shape, and a body portion or member, the latter member being fitted or seated in the space between the two legs 17 and 18 of the former member. The second-named member is composed of a flat core 19 having an enlarged upper portion, and a metal strap 20 bent around the edge portion of the core and suitably secured thereto. The flat top portion of this strap is formed with a set of flattened teeth 21 one of which is provided with an upstanding threaded projection or pin 22. The two legs 17 and 18 of the clip 15 are disposed directly against the adjacent faces of the body member and are fastened thereto by bolts which pass through the core portion of the latter and through said legs. At its lower end, the clip is formed with a lateral wheel-supporting spindle 23 which may extend from either side thereof so as to dispose the wheels either between or exteriorly of the axle arms. See Figs. 4 and 7.

The teeth 21 above referred to are designed to engage with the sets of teeth 24 formed upon a strap 25 arranged against the under surface of each shaft, the extent of adjustment being limited by the number of such sets, as will be apparent. The straps 25 are formed with a pin-receiving aperture 26 for each set of teeth 24, and are fastened to the shafts by connecting bolts which pass through the ends of said straps and through those of a pair of straps 27 disposed upon the upper surfaces of the shafts between the ends of the arch bars, the latter straps extending across the ends of the tree 10. The terminals of the pins 22 project through perforations in the shafts, and through registering apertures 28 in straps 27.

As shown in Fig. 5, the two legs of each clip are of unequal length, the outer leg 17 extending past the outer edge of the toothed portion of strap 20 and across the outer side face of the adjacent shaft, while the inner leg 18 has its apertured upper portion 29 bent inwardly and extended up to the adjacent strap 13 to which it is removably connected by a bolt 30 or the like. To permit the adjustable connection of the extensions 29 to said straps 13, the latter are formed with a plurality of apertures 31 wherein the bolts 30 are interchangeably engaged. Said bolts and the pins 22 are provided with nuts by means of which they are held against displacement.

The construction above described provides for a relative adjustment between the wheels and the shafts of the vehicle by engaging the toothed portions of the axle arms with one or another of the sets of teeth formed on the straps 25, the pins 22 being inserted in the proper passages constituted by the registering apertures 26 and 28 and the perforations in the shafts while at the same time the clip extensions 29 are bolted to straps 13 at the proper points. It is deemed advisable, however, to maintain the wheels as far forward as possible of the vehicle, so as to bring the horse between the wheels and to dispose the seat to the rear of the wheels, whereby the weight of the driver upon the seat may be utilized to tilt the forward portions of the shafts upwardly, thereby relieving the horse from the downward pressure which they would otherwise exert. This is a matter of extreme importance where great speed is required, as in a race, since the horse is in no way impeded by the shafts and hence is free to assume his proper gait. The adjusting operation, moreover, may be readily and quickly accomplished, and, when completed, the axle arms will have a rigid connection with the frame or body of the vehicle.

I claim as my invention:

1. In a vehicle of the type specified, the combination of a frame including a pair of shafts; a vertical axle arm connected to each shaft and connected to the same for bodily adjustment longitudinally with respect thereto, and a wheel carried by each arm.

2. In a vehicle of the type specified, the combination of a frame including a pair of shafts, and tie-bars connecting the shafts; a pair of axle arms connected to said shafts for bodily adjustment longitudinally of the same, said arms having portions thereof adjustably connected with said tie-bars; and a wheel carried by each arm.

3. In a vehicle of the type specified, the combination of a frame including a pair of shafts, a pair of tie-bars connecting the shafts, and a pair of straps connecting the tie-bars adjacent the ends thereof; a pair of axle arms connected to said shafts for bodily adjustment longitudinally of the same, each arm having a portion thereof adjustably connected with the adjacent strap; and a wheel carried by each arm.

4. In a vehicle of the type specified, the combination of a frame including a pair of shafts each having a toothed member attached to its under surface; a pair of axle arms having toothed portions engaged with the adjacent toothed members for bodily adjustment longitudinally of said shafts; a wheel carried by each arm; and means for retaining said arms in adjusted position.

5. In a vehicle of the type specified, the combination of a frame including a pair of shafts; an axle arm connected to each shaft for bodily adjustment longitudinally of the same, each arm having its upper end engaged with the under surface of the corresponding shaft, and provided at its lower end with a lateral spindle; and a wheel carried by each arm.

6. In a vehicle of the type specified, the combination of a frame including a pair of shafts; a vertical axle arm movable bodily beneath each shaft for adjustment longitudinally thereof; a wheel carried by each arm; and means for retaining said arms in adjusted position.

7. In a vehicle of the type specified, the combination of a frame including a pair of shafts; an axle arm connected to each shaft for bodily adjustment longitudinally thereof, each of said arms comprising a body portion and a clip straddling the same; and a wheel carried by each clip.

8. In a vehicle of the type specified, the combination of a frame including a pair of shafts each having a toothed member attached to its under surface; an axle arm connected to each shaft for bodily adjustment longitudinally thereof, each of said arms comprising a body portion having a toothed upper end engaging the corresponding toothed member, and a clip straddling said body portion; and a wheel carried by each clip.

9. In a vehicle of the type specified, the combination of a frame including a pair of shafts, a pair of tie-bars connecting the shafts, and a pair of straps connecting the tie-bars adjacent the ends thereof; a pair of axle arms connected to said shafts for bodily adjustment longitudinally of the same, each of said arms comprising a body portion engaged with the adjacent shaft, and a clip straddling said body portion and having one of its legs adjustably engaged with the adjacent strap; and a wheel carried by each clip.

10. In a vehicle of the type specified, a frame comprising a pair of shafts having their rear ends connected and curved upwardly to form a bow, a pair of arched tie-bars connecting said shafts, and projecting upwardly and into contact with each other; and a seat resting upon and fastened to said bow and the contacting portions of said bars and constituting a tie between the same.

In testimony whereof I have hereunto set my hand in presence of two subscribing witnesses.

GEORGE W. HUBBARD.

Witnesses:
J. L. TYRIE,
J. F. KERNODLE.